April 6, 1965  W. ZEIDLER  3,176,802
TELESCOPIC HYDRAULIC SHOCK ABSORBER WITH FLEXIBLE OUTER TUBE
Filed March 2, 1962
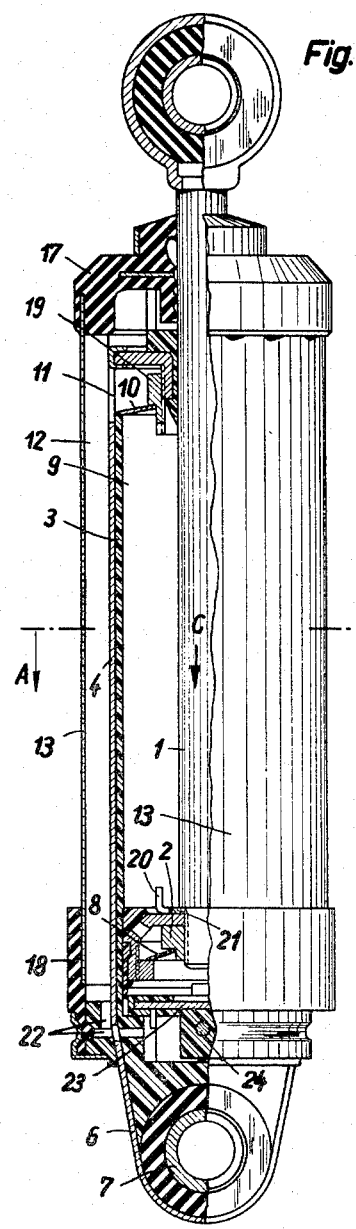
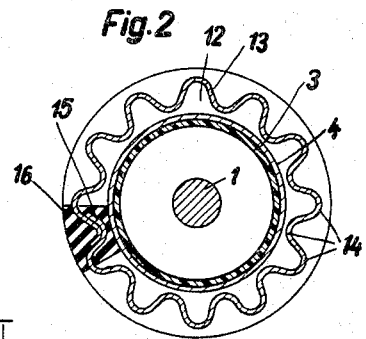
Inventor:
Willi Zeidler
By
Watson, Cole, Grindle & Watson
Attys.

United States Patent Office 3,176,802
Patented Apr. 6, 1965

3,176,802
TELESCOPIC HYDRAULIC SHOCK ABSORBER
WITH FLEXIBLE OUTER TUBE
Willi Zeidler, Dusseldorf, Germany, assignor to Firma
Rheinmetall G.m.b.H., Dusseldorf, Germany
Filed Mar. 2, 1962, Ser. No. 176,955
Claims priority, application Germany, Mar. 7, 1961,
R 29,823
1 Claim. (Cl. 188—100)

This invention relates to a telescopic hydraulic shock absorber provided with a compensating chamber which accommodates the working liquid displaced by the immersion of the piston rod into the dashpot cylinder and which has a flexible or extensible outer cover respectively.

Shock absorbers are known in which the surrounding sleeve or the outer cover respectively of the compensating chamber are made of a plastic material which is capable of extension, e.g. when heated, or of rubber tubing which will extend when subjected to pressure. These constructions result in an automatic increase of the capacity of the compensating chamber whenever the temperature of the working fluid rises or when the pressure increases. The intention is also that the whole of the quantity of working liquid displaced by the piston rod of the damper piston, when the latter becomes immersed in the dashpot cylinder, shall be accommodated in the compensating chamber.

The drawback of this arrangement is the fact that if the outer sleeve is made of plastic, its volumetric capacity will increase only by a small amount due to extension since the extensibility of the material is naturally very limited. This small increase in capacity may therefore not be adequate completely to accommodate all the working liquid which has been displaced by the immersion of the piston rod. In addition such a tube or sleeve will only offer comparatively little resistance to buckling. This will apply to an even more marked degree to an outer sleeve made in the form of a rubber tube.

It is an object of the invention to overcome the disadvantages of these known embodiments from which it is distinguished by the fact that the outer sleeve of the compensating chamber takes the form of a casing or tube which is corrugated over the whole or only part of its length, having corrugations at right angles to the direction of travel of the damper.

In a preferred embodiment of the invention, the outer sleeve or outer tube respectively consists of elastic corrugated metal sheet, more particularly steel sheet. In that embodiment the outer tube encloses the dashpot cylinder at a distance; it is spot welded along its seam and is closely vulcanised over the whole length of its seam and at its two ends.

As a result of this construction of the outer sleeve or outer tube respectively in accordance with the invention, the compensating chamber can deform or extend respectively in a radial direction to a sufficient degree to allow for an adequate increase of volumetric capacity, at the same time providing good resistance to buckling. In addition this arrangement, together with the location of the valves through which the working liquid has to flow, will lead to a permanently maintained circulation of the latter; this will have a desirable result on the temperature of the oil and hence on the life of the shock absorber.

When the working liquid is warmed or heated respectively, heat is given off to the ambient air by means of the surface of the outer tube which is substantially increased in area by virtue of its corrugations. Thus, the corrugations result not only in the increase of radial extensibility or flexibility of the outer tube and in the increase of the volumetric capacity of the compensating chamber, but also in the provision of cooling ribs and, in addition, in an increase of buckling stiffness.

An embodiment of the invention will now be explained by reference to the accompanying drawing in which:

FIG. 1 shows a telescopic hydraulic shock absorber with a corrugated outer tube partially in longitudinal section and partly in outside view, and FIG. 2 is a section of the embodiment shown in FIG. 1 taken on the line A–B.

Referring to the drawing, the piston rod 1 has attached to it the damper piston 2 which travels along the dashpot cylinder 3 which may be made e.g. of a plastic material. The dashpot cylinder 3 is enclosed by the tube 4 which may for example be made of sheet metal and one of whose ends is provided with a lug 6 in which sits an attachment eye 7.

When the damper piston travels in the direction indicated by the arrow C, the working liquid passes in the usual manner through the valve 8 in the damper piston, which in the example here illustrated is shown as a disc valve—and flows into the space 9 of the dashpot cylinder. The working liquid which has been displaced by the immersion of the piston rod 1 flows through the valve 10, which is also shown in the form of a disc valve, and through a number of apertures provided in the periphery of the tube 4 into the compensating chamber 12 which is formed by the tube 4 on the inside and by the outer tube 13, which is capable of elastic deformation, on the outside.

To render the outer tube 13 capable of elastic deformation in accordance with the invention, it is made for the whole or for part of its length of corrugated tubing, with advantage consisting of sheet steel.

It will be seen from FIG. 1 that the outer tube 13 is provided over the whole of its length with corrugations 14 which provide the tube with considerable buckling stiffness and which also facilitate elastic deformation in a radial direction. In this arrangement the peaks and valleys of the corrugations extend in a normal direction round the periphery of the outer tube 13, i.e. they are located in a direction normal to that of the travel of the damper.

In all cases the outer tube 13 is with advantage made of a rolled metal sheet capable of elastic deformation, more particularly of steel sheet; it is spotwelded at its seam 15 and it is vulcanised over the whole length of its seam to a rubber block 16. This rubber block 16 is joined to the two end caps 17 and 18 which are also made of rubber. This ensures the proper sealing of the outer tube 13.

When the damper piston 2 travels in a direction opposite to that of the arrow C, the valve 8 closes whilst the valve 10 opens. This is the so-called tension stroke of the shock absorber; the forces involved in the movement can be adjusted by means of the adjusting nut 19. When the shock absorber is fully extended, this nut engages with the projections 20 of a plate 21 which is attached to the damper piston 2 and which can be rotated in order to alter the force exerted by the disc spring 10. The working liquid flows from the compensating chamber 12 through the orifices 22 at the periphery of the bottom end of the tube 4 into the space underneath the damper piston 2; it causes the valve 23 to open which tends to close when the damper piston 2 travels in the direction of the arrow C. The valve 23 takes the form of a simple non-return valve and is acted upon a spring rod.

The invention is not restricted to the embodiment herein illustrated and described. Thus, the corrugations may also extend over part of the length of the outer tube only, preferably over the central portion of the outer tube.

What I claim is:

A telescopic hydraulic shock absorber comprising a piston rod and piston, a dashpot cylinder composed of a plastic material and in which the piston is movable and forming a space for a working fluid, a metal tube surrounding the cylinder which is open at one end through which the piston rod projects and closed at the other end to form a lug for an attachment eye, a corrugated sheet metal tube surrounding the first-mentioned metal tube and spaced therefrom to form a space for the fluid, said corrugations extending parallel to the longitudinal axis of the shock absorber to provide rigidity against buckling but to facilitate slight elastic deformation in radial directions, and end caps of rubber provided at the ends of the space formed by the corrugated sheet metal tube to close the ends of the latter, said sheet metal tube having overlapping longitudinal edges to form a seam closed by a rubber block vulcanized to the seam.

References Cited by the Examiner

UNITED STATES PATENTS

| | | | |
|---|---|---|---|
| 1,913,573 | 6/33 | Turner | 165—81 |
| 2,132,978 | 10/38 | Stewart | 309—3 |
| 2,445,471 | 7/48 | Buckholdt | 165—83 |
| 2,510,727 | 6/50 | Sussenbach | 29—458 X |
| 2,534,448 | 12/50 | Jantsch | 165—83 |
| 2,576,658 | 11/51 | Warner | 188—100 |
| 2,677,393 | 5/54 | Cornelius | 138—30 |
| 2,691,518 | 10/54 | Smith | 267—694 X |
| 2,782,495 | 2/57 | Beck et al. | 29—458 X |

FOREIGN PATENTS

| | | |
|---|---|---|
| 526,041 | 2/54 | Belgium. |
| 1,150,431 | 8/57 | France. |

ARTHUR L. LA POINT, *Primary Examiner.*

A. JOSEPH GOLDBERG, EUGENE G. BOTZ,
*Examiners.*